United States Patent [19]

Kollross

[11] 4,359,806
[45] Nov. 23, 1982

[54] APPARATUS FOR AXIAL SHIRRING OF PLASTIC TUBULAR MATERIAL, ESPECIALLY ARTIFICIAL CASING FOR SAUSAGE MANUFACTURE

[76] Inventor: Gunter Kollross, Am Wallerstadter Weg 20, D-6081 Dornheim, Fed. Rep. of Germany

[21] Appl. No.: 215,259

[22] Filed: Dec. 11, 1980

[30] Foreign Application Priority Data

Jun. 15, 1979 [DE] Fed. Rep. of Germany ....... 2924059

[51] Int. Cl.³ .............................................. A22C 13/02
[52] U.S. Cl. ......................................... 17/1 R; 17/42; 17/49
[58] Field of Search .................... 17/1 R, 1 F, 41, 42, 17/49; 53/581

[56] References Cited

U.S. PATENT DOCUMENTS

3,112,516 12/1963 Bonnee ..................................... 17/42
3,454,981 7/1969 Martinek ................................. 17/42
3,597,791 8/1971 Marbach ............................... 17/42 X

Primary Examiner—Willie G. Abercrombie
Attorney, Agent, or Firm—Larson and Taylor

[57] ABSTRACT

An apparatus for axial shirring of tubular material. A turret has a plurality of shirring tubes thereon and is indexible to move the shirring tubes transversely and is also capable of limited axial movement. A stationary shirring tool cooperates with a shirring tube brought by the turret to a shirring position. During shirring, the shirring tube is stationary as the tubular material being shirred engages a stop member movable axially along the shirring tube. First the stop member is brought towards the shirring tool and then controllably moved away therefrom during shirring. The apparatus also includes a bracing means for centering the folds of the shirred tubular material during the shirring step. At a further position finished shirred tubular material may be compressed and removed from the shirring tube by a pressing means which can operate independently of and concurrently with a shirring procedure.

17 Claims, 7 Drawing Figures

APPARATUS FOR AXIAL SHIRRING OF PLASTIC TUBULAR MATERIAL, ESPECIALLY ARTIFICIAL CASING FOR SAUSAGE MANUFACTURE

The invention relates to an apparatus for axial shirring of plastic tubular material, especially artificial casing for sausage manufacture, with a plurality of shirring tubes disposed on an indexible and axially displaceable turret, said shirring tubes being continuously movable toward and into a stationary shirring tool, from which the tubular material fed over the free end of the shirring tube can be pushed together against a stop disposed on each shirring tube, to thereby form a shirring.

Such apparatus serve to automate production of tubular cavities, such as are utilized primarily on stuffing machines in sausage factories and meat processing plants.

In known shirring apparatus, the stops against which the shirrings are shirred on the shirring tubes are fixedly disposed on the said shirring tubes close to their end which is clamped to the turret, and the turret before the start of each shirring operation is moved toward the shirring tool until the stop of that tube at the shirring position is immediately behind the shirring tool. During shirring the turret is then guidedly moved back, away from the shirring tool, and must finally, independently of the desired shirring length, be withdrawn from the region of the shirring tool, together with the tube which supports the new shirring, so that the turret can be switched over to another position whereat the next shirring tube is positioned to receive another length of tubular material. With the known devices there are, in addition to the actual shirring time, considerable dead times, and with each shirring cycle large masses in the form of a turret with all the shirring tubes which it supports must be moved back and forth over almost the entire length of the shirring tube, and this is associated with a great consumption of energy. A particular disadvantage of the known apparatus is the fact that after further movement of the turret, additional treatment of the completed shirring, especially a subsequent axial compression thereof, can be effected only with difficulty and with considerable expenditures for additional machinery because the tubes which support those shirrings which are shifted farther on for further treatment are always connected to the turret for axial movement therewith.

To avoid the latter drawback, it is also known that the shirring tool rather than the turret can be moved during shirring. However there are the same dead times with this arrangement.

Apparatus are also known in which a single shirring tube is engageable alternatingly at its end which is opposite the shirring tool, at a point between its ends, and in this way the shirring that is shirred against a backward moving stop is pushed off after separation from the length of tubular material, by means of a special pusher device, onto an axially joining conveyor tube, on which the shirring is further treated or transported for further treatment at another location by means of a revolving device having a plurality of such conveyor tubes. However, such apparatus are extremely expensive to construct, and the pushing off of the shirrings from the shirring tube onto the conveyor tube presents the danger of damage to the tubular material.

The present invention concerns the problem of developing a shirring apparatus such that, with the most protective treatment possible of the tubular material, there will be substantially less dead time than with the known apparatus, while allowing further treatment of the shirrings at other locations, without requiring great expenditures for additional machinery.

According to the present invention, this problem is solved in that the turret with the shirring tubes are stationary during the formation of the shirrings and each shirring tube bears a stop which is axially slidable thereon which, in the formation of the shirring, can be controllable moved backward, i.e. away from the shirring tool.

Advantageously axial movement of the turret is limited to the distance required by the shirring tube which has been brought over in front of the shirring tool, upon the indexing of the turret, to move the entrance of the free end of that tube into the region of the shirring tool. The axial movement of the turret is consequently extremely short, and the stop on that tube which is in the shirring position need only be slid along the shirring tube until it is against the shirring tool. This can occur extremely quickly and requires little force. In contrast to this, the rest of the shirring tubes are stationary during the shirring process, and the shirrings on them can be easily treated there or drawn off.

To prevent fluttering of the free end of the shirring tube in the course of the shirring, according to another advantageous feature of the invention, that shirring tube which is introduced into the shirring tool is advantageously engageable during the formation of the shirring by stabilizing means positioned radially over the shirring, and constituted by guide rolls which are radially adjustable with reference to the shirring. This feature can be effected structurally in a particularly advantageous way by providing two guide rolls having a trough profile and borne on levers swingable toward each other by a power cylinder.

Since the main period of each shirring cycle is determined by the duration of the shirring process, during which all shirring tubes are stationary, the further treatment of the shirrings that have meanwhile been indexed away from the shirring position can take place. In particular an "after pressing" and a "pushing off" from the tube which supports them can occur at a single station. It therefore suffices, in an advantageous embodiment, if the turret carries two shirring tubes which can be indexed by 180°. This further simplifies the apparatus according to the present invention.

For completion of automatic operation it is also advantageous to dispose a cutting device immediately adjacent the shirring tool, on the side thereof toward the stop, whereby the finished shirring can be separated from the tubular material directly after the shirring tool, before the turret is moved axially toward the shirring tool. Such a cutting device is advantageously constituted by a motor driven blade which can be moved crosswise through the shirring after the shirring tube has been moved out of the shirring tool.

The relatively short stroke of the turret which is needed for introduction of that shirring tube aligned with the shirring tool can also be utilized to position a fixed backup located opposite the free end of another shirring tube, and to compress the finished shirring axially after the further indexing of the turret, by moving the stop on that other tube up against this backup. Advantageously this backup is formed by two jaws which open after the pressing operation and thereby allow the pushing off of the shirring from the shirring tube by means of the stop. Behind the said jaws there may be a receiver for the shirrings, by means of which the shirring can be taken to a device for twisting one end of the shirring.

Another feature of the present invention is that the stop on each shirring tube is constituted by a sleeve which tapers conically at its end, which sleeve can be engaged in the shirring position by a connecting member which is controllably movable along the shirring tube. Advantageously this connecting member comprises two claw levers which engage a groove of the sleeve, are swingable against each other, which are borne on a carriage which is slidable parallel to the shirring tube by a hydraulic cylinder, and which are actuatable by another power cylinder. By means of the hydraulic cylinder it is possible to control the backward motion of the stop in the course of the shirring in precise correlation with the formation of the shirring, thereby making it possible to press the tubular material by means of the shirring tool into narrow folds on the shirring tube, the folds being practically free from influences of air. Consequently, in the actual shirring a great fold density is obtained and a compact shirring is created which, after separation from the length of tubular material, has virtually no tendancy to expand again upon a further indexing of the turret. Correspondingly for the pressing process there can be a carriage movable by a power cylinder with a connecting member which can be controllably moved crosswise to the direction of movement of the shirring tube into engagement with the annular groove of the stop sleeve.

The shifting of the turret between its two end positions can be effected, in principle, in any way. Advantageously however for this motion a double action power cylinder is provided.

An example of a preferred embodiment of an apparatus according to the present invention is described in detail below in connection with the drawing.

Figure 1:
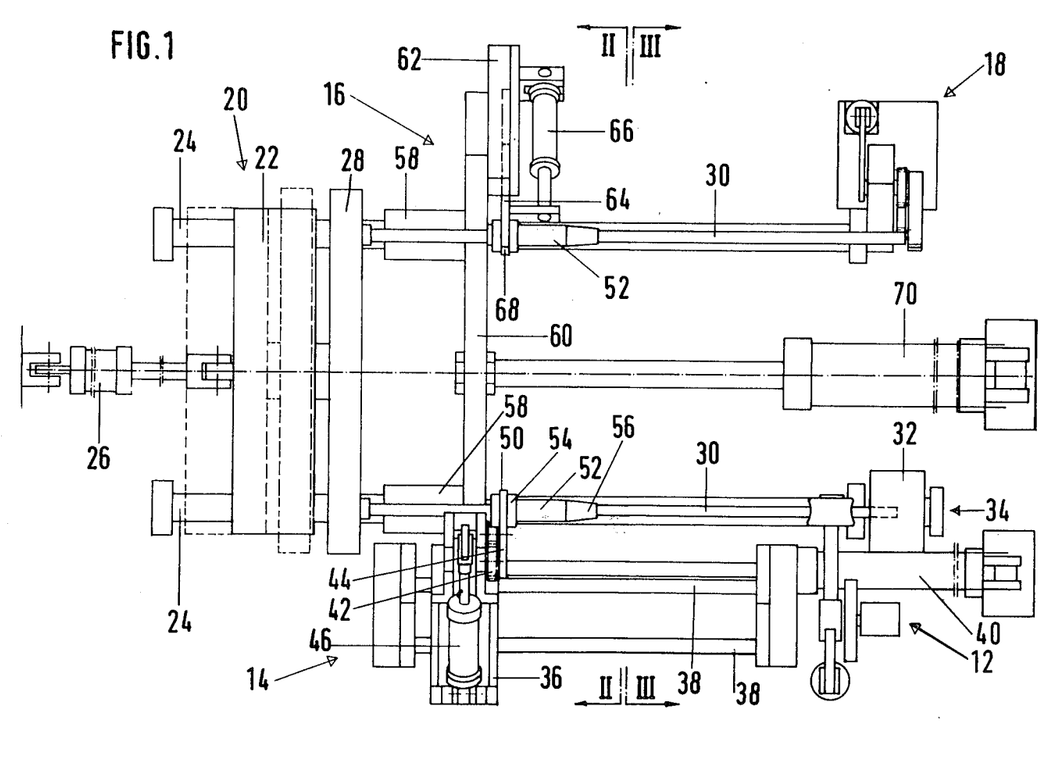
FIG. 1 shows a top view of the shirring apparatus, as it would be arranged when disposed on a machine bed (the bed is not shown in this figure).
Figure 2:
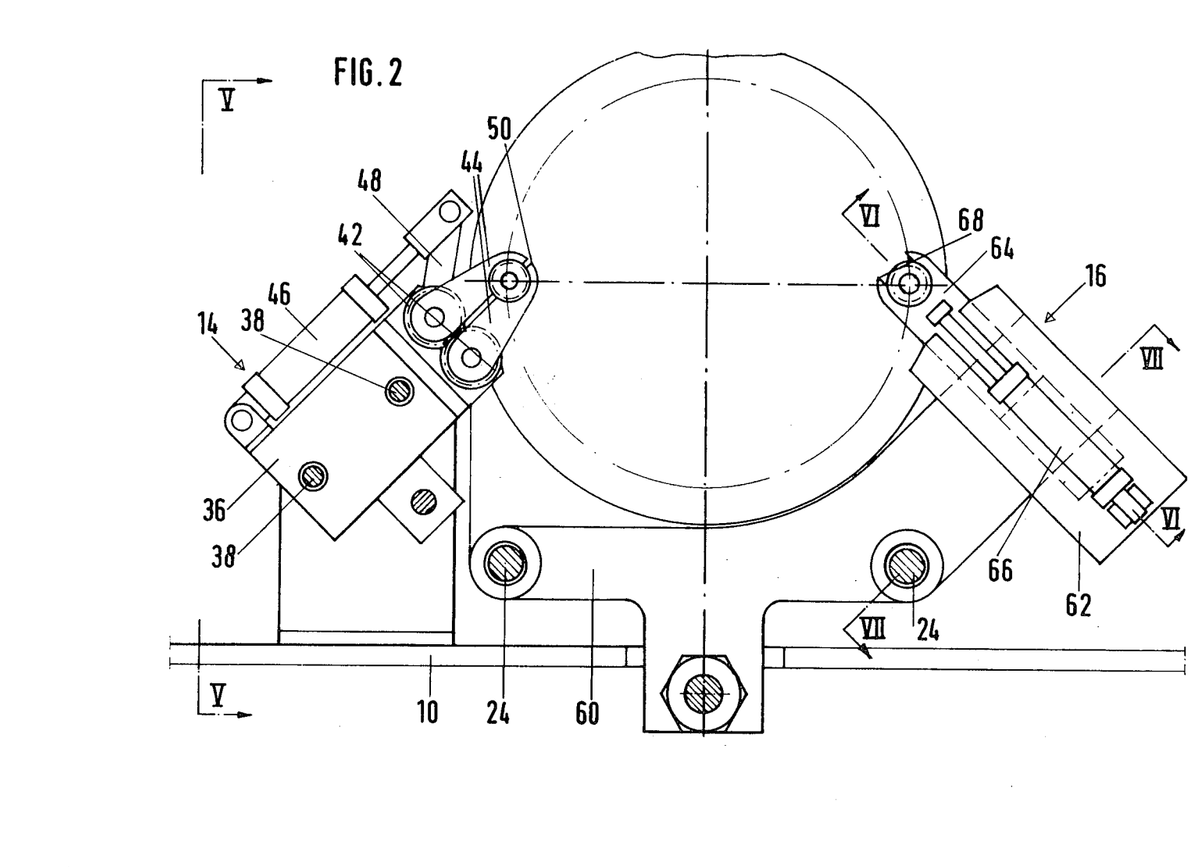
FIG. 2 is a frontal elevational view of the turret head and of the counterhold station and the pressing station, taken in the direction of arrows II—II of FIG. 1.
Figure 3:
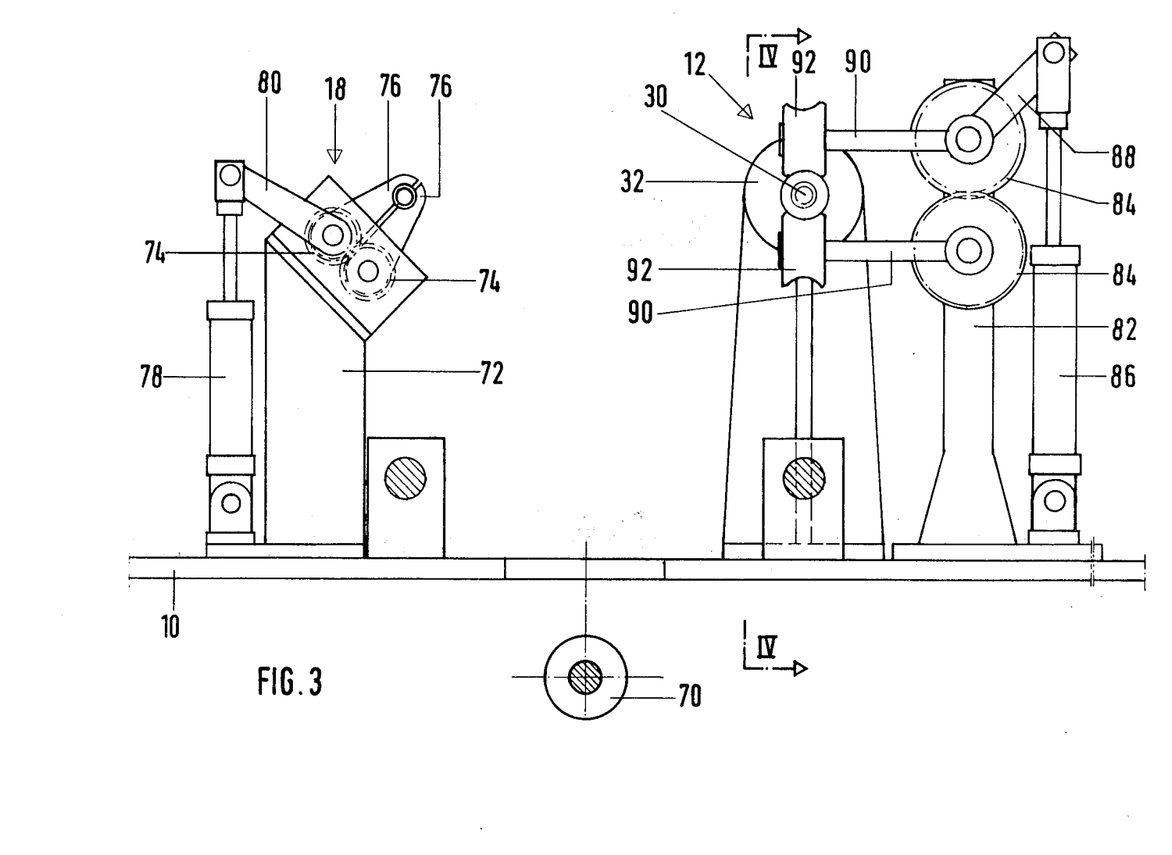
FIG. 3 is a frontal elevational view of the shirring and bracing station and of the press backup, taken in the direction of arrows III—III of FIG. 1.

The apparatus shown in the figures, especially FIGS. 1–3 comprise four main components disposed on a machine bed 10, namely: a shirring and bracing station 12, a counterhold station 14, a pressing station 16, and a pressing backup 18.

The shirring and bracing station 12 and the counterhold station 14 are disposed on one side of the long midplane of the device, and pressing station 16 and the pressing backup 18 are on the other side. Along said long midplane of the device there is provided the turning axis of a turret 20 which can be indexed stepwise by 180°. The turret's gear housing 22, which contains a pneumatic indexing drive (not illustrated) is movable on two guide rods 24 fixed by suitable brackets on machine bed 10, said guide rods 24 being symmetrical to the longitudinal direction of the device and parallel to each other, and driven by a pneumatic power cylinder 26 between a "switch position" indicated by dashed lines in FIG. 1 and a "working position" drawn in solid lines.

The rotatable part of turret 20 which is made as a plate 28 bears at diametrically opposed points thereon two shirring tubes 30 which extend parallel to each other, and are of appropriate diameter for acceptance of the tubular material which is to be shirred in a known way by a shirring tool which produces tubular shirrings. The shirring tool is only symbolically indicated (FIGS. 1 and 3) and it may for example comprise three drivable shaped rolls or toothed belts distributed about the axis of the shirring tube, or a worm sleeve driven in revolution about the axis of the shirring tube. The position of shirring tool 32 with respect to turret 20 is such that the end of one shirring tube in the "switch position" stands free before the shirring tool, and in the working position of the shirring tool that end of the shirring tube passes straight through the shirring tool without extending out beyond the tool to any meaningful extent. The path of motion of turret 20 is thus relatively short and can amount, for example, to about 50 mm.

The tubular material which is to be shirred is fed to the shirring tool 32 in the direction of arrow 34 is a known way, e.g. by squeeze and conveyor rolls (not shown) and inflated by compressed air supplied via shirring tube 30. Shirring tool 32 moves the tubular material forward to form folds on shirring tube 30, while the forward end of the shirring thus formed is braced by means of the counterhold station 14.

Counterhold station 14 has a carriage 36 borne on twoguide rods 38 fixed by means of appropriate brackets to the machine bed, and movable by means of a double acting hydraulic power cylinder 40 parallel to the adjacent shirring tube 30. On carriage 36 there are swingably borne two claw levers 44 coupled to turn counter to one another via a pair of gears 42 which are in turn driven by a power cylinder 46 via a rocker 48. Levers 44 include tongs 50 for engaging an annular groove 54 on the thickened end of a longitudinally slidable counterhold sleeve 52 on each shirring tube 30.

The other end of the counterhold sleeve is tapered at 56 and constitutes the bracing mentioned above for the forward end of the shirring, during the shirring operation.

The pressing station 16 comprises a slidable carriage plate 60 which is movable on guide rolls 24, advantageously with ball bushings 58, said plate 60 supporting a housing 62 for a pusher 64. A double acting pneumatic power cylinder 66 is disposed between housing 62 and pusher 64, and it can bring that end of pusher 64 which has a jaw opening 68 into engagement with annular groove 54 of counterhold sleeve 52 on the shirring tube. The piston rod of a double acting hydraulic power cylinder 70 engages carriage plate 60. The housing of the said power cylinder 70 is fixed on machine bed 10. By means of this power cylinder 70, the counterhold sleeve 52 engaged by pusher 64 can thus be moved along shirring tube 30 for pressing and later pushing off of a shirring from the shirring tube. To receive the pressing force there is provided a backup 18 which, as shown in FIG. 3, comprises a bracket 72 on which two tong levers 76 are swingably borne and coupled to turn counter to each other via gears 74, and swingable between an open position and a closed position by means of a double acting pneumatic power cylinder 78, via a rocker arm 80. The tong levers 76 are provided with jaw openings directed toward each other which, in the closed position form a passage of smaller diameter than the inner diameter of the shirring, so that in the movement of pressing station 16 with the counterhold sleeve 52 engaged thereby, against backup 18, the shirring on shirring tube 30 can be braced against the tong levers 76 and will thereby be effectively compressed. The swing angle of tong levers 76 is such that in the open position the shirring can pass through and become thrust by the pressing station 16 from shirring tube 30 and taken for example to a packaging device (not shown) or to a twisting device connected to the free end of the shirring tube 30 behind the tong levers 76.

Figure 4:
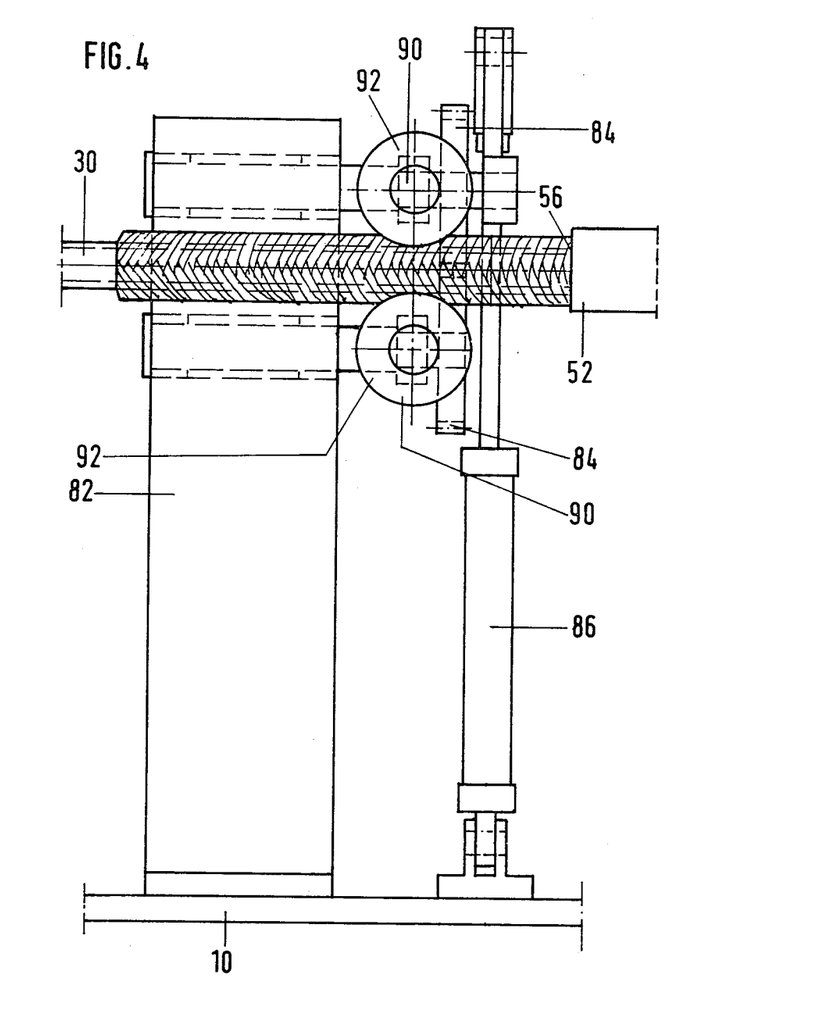
FIG. 4 is a lateral elevational view of the bracing station (without the shirring station), taken in the direction of arrows IV—IV of FIG. 3.
Figure 5:
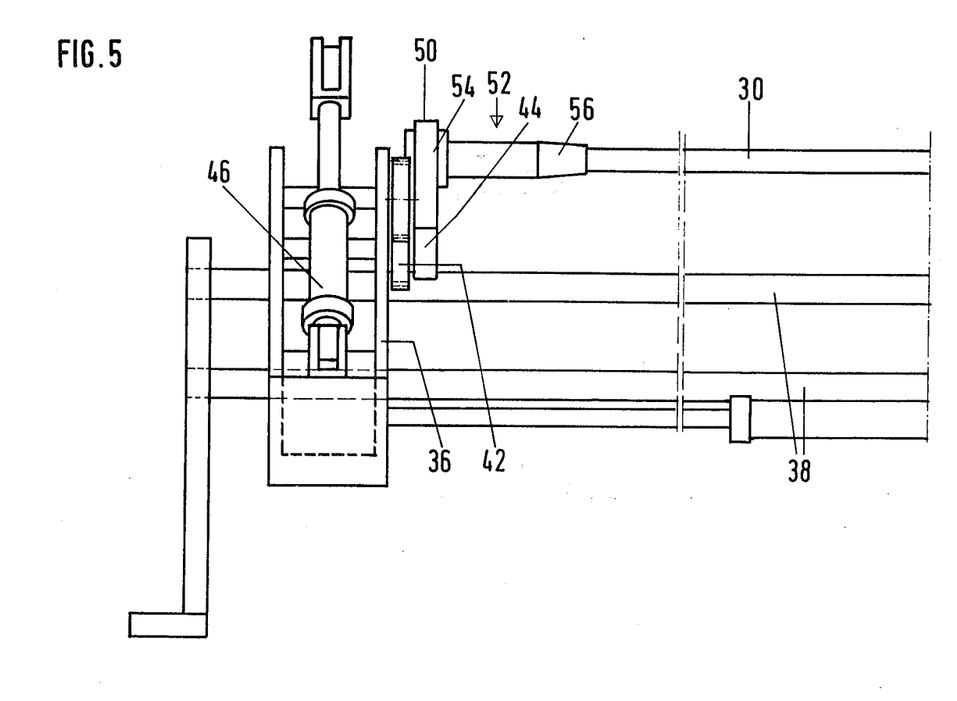
FIG. 5 is a lateral elevational view of the counterhold station, taken in the direction of arrows V—V of FIG. 2.
Figure 6:
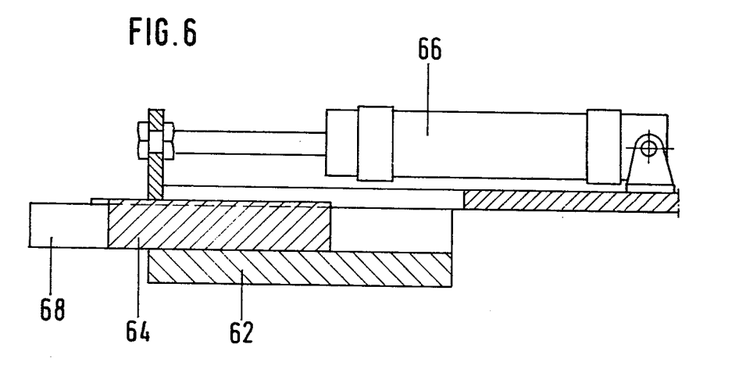
FIG. 6 is a cross-sectional view through the pressing station, taken along line VI—VI of FIG. 2.
Figure 7:
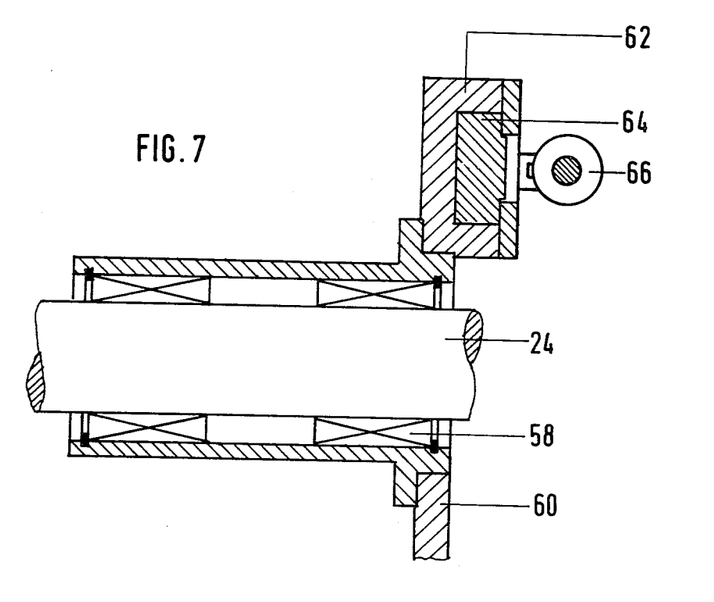
FIG. 7 is another cross-sectional view, taken through the pressing station, along line VII—VII of FIG. 2.

Finally, shirring and bracing station 12, in addition to shirring tool 32, presents a bracing device, which, as shown in FIGS. 3 and 4, consists of upright 82 disposed on machine bed 10, on which roll levers 90 are borne, to swing counter to one another, being coupled one above the other via a gear 84 and swingable by means of a power cylinder 86 via rocker arm 88. The free ends of roll levers 90 each bear a profile roll 92 which, in the swinging of roll levers 90 into the horizontal position, is braced against the upper or under side of the shirring produced by shirring tool 32 on shirring tube 30, thereby centering shirring tube 30.

The pneumatic switch drive for turret 20, the hydraulic power cylinders 40 and 70, as well as pneumatic power cylinders 46, 66, 78 and 86 are actuatable by magnetic valves which in turn are controlled by an electric remote control with use of end and pulse switches. The basic construction of such controls is known and in the present case it is so designed that it yields the following succession of functions.

Let it be assumed that the individual components of the above described apparatus are in the following starting position: Turret 20 is in the switch position indicated by dashed lines in FIG. 1. Profile rolls 92 are disengaged from shirring tube 30; the pressing pusher 64 is retracted into housing 62, and counterhold carriage 36 and carriage plate 60 are in the drawn back position, near the head of turret 20. Counterhold sleeves 52 are also in a drawn back position which allows counterhold tongs 50 to engage counterhold sleeve 52 in annular groove 54, while counterhold sleeve 52 on the other shirring tube is moved with respect to pressing pusher 64, by the stroke of pneumatic power cylinder 26, toward turret 20.

If now the control is switched in or a new work cycle is triggered, turret 20 first indexes by 180° and presents an empty shirring tube 30 to the front of the shirring tool 32. Counterhold tongs 50 now close and engage counterhold sleeve 52 on the empty shirring tube 30. Immediately thereupon, hydraulic power cylinder 40 is switched on and moved toward the right (with reference to FIG. 1). It first pushes rapidly forward and then with a slowed forward push, pushes counterhold sleeve 52 onto shirring tube 30 until it is directly in front of shirring tool 32. In the last phase of this movement pneumatic power cylinder 26 is actuated and brings turret 20 with shirring tubes 30 into the working position (solid lines in FIG. 1) in which the empty shirring tube 30 extends with its free end passing through shirring tool 32.

As soon as this position is reached, shirring tool 32 is turned on, and at the same time hydraulic power cylinder 40 is oppositely actuated with a forward pushing motion which is such that counterhold sleeve 52 in counterhold station 14 is moved back, corresponding to the formation of a shirring on shirring tube 30, at such a rate that the shirring is constantly under the necessary counterpressure for formation of narrow folds.

As soon as counterhold sleeve 52 has left the area of the bracing device, pneumatic power cylinder 86 is acutated to swing roll levers 90 with rolls 92 into position against the shirring being formed on shirring tube 30, whereby the shirring tube with the shirring is centered effectively during the remainder of the shirring process.

After the desired shirring length has been formed, which length depends upon the adjustable position of a pulse switch over which the counterhold carriage 36 can travel, the shirring tool 32 is switched off and pneumatic power cylinder 26 is actuated. This draws the turret 20 to the left with that shirring tube 30 which bears the just-produced shirring from shirring tool 32, whereby the shirring end is somewhat pulled between rolls 92 and shirring tool 32. While the counterhold station 14, with counterhold sleeve 52, by continued actuation of hydraulic power cylinder 40, runs in the direction of the head of turret 20 into its end position in which counterhold tongs 50 open, a cutter (not shown) separates the shirring immediately behind the shirring tool 32. Meanwhile, roll levers 90 and rolls 92, by reverse actuation of pneumatic power cylinder 86 are moved upward and downward, respectively, out of engagement with the cut shirring. The work cycle on the shirring side of the device is thereby complete, and the new shirring produced on shirring tube 30 is then brought over to the pressing side of the device to start the next work cycle by indexing turret 20.

On the pressing side of the device the operating cycle proceeds as follows:

After indexing of turret 20, pressing backup 18 closes by means of power cylinder 78 so that during the subsequent advance of turret 20 the shirring tube 30 that is now on the pressing side with the cut end of the shirring comes into position against the closed backup.

After the advance of turret 20 into the working position (solid lines in FIG. 1), annular groove 54 of counterhold sleeve 52 reaches the region of engagement of jaw opening 68 of press pusher 64, at which time 68 is thrust out of housing 62 by actuation of power cylinder 66 and brought into engagement with counterhold sleeve 52. At this time pressure fluid acts on hydraulic power cylinder 70 and pressing station 16 with counterhold sleeve 52 moves to the right along shirring tube 30 toward the shirring thereon, as a result of which the shirring is compressed to the desired size, the pressure backup 18 first being closed. As soon as the desired compression size is reached, pressing station 16 is actuated by a pulse switch which allows opening of backup 18. With the further movement of pressing station 16 along shirring tube 30, the shirring is then pushed off its shirring tube 30 and transferred for example to a packaging device (not shown) or a twisting device.

As soon as pressing station 16 with counterhold sleeve 52 reaches the free end of shirring tube 30, the hydraulic power cylinder 70 is reversed and pressing station 16 moves rapidly back to its starting position in which press pusher 64, by means of pneumatic power cylinder 66, is disengaged from counterhold sleeve 52 and drawn back. This process ends before turret 20 is once more withdrawn by power cylinder 26 into its switching position as described above, so that with this retraction movement the counterhold sleeve 52, released from the press pusher 64, moves back with turret 20 into the starting position which is shifted axially with reference to pusher 64.

Obviously, during shirring on one shirring tube the pressing of the previously shirred piece and the pushing of it on or from the other shirring tube occurs in opposed directions. Since the shirring process occupies the major part of the working cycle time, this time can be fully exploited for the pressing and pushing off on the other shirring tube without any prolonging of the work cycle. The length of the work cycle is thus determined by: the switching time for the turret; the advance time for the counterhold sleeve, first in rapid advance and then in the working advance up to a point before the shirring tool; the shirring time; the time for the backward movement of the turret after the shirring separation time; and the time for opening the bracing device.

Of these times, the shirring time is the longest, whereas the other times are comparatively short so that the total time for a work cycle is less than twice the actual shirring time. During these mentioned times there is the pressing and pushing off as well as the pulling back of the pressing station to the other side of the device without a requirement for additional time, whereby the pressing and pushing off occur in the same switch position of the turret so that the latter, as shown and described in the illustrated embodiment need only have two shirring tubes staggered by 180° with reference to each other. Obviously there could be more shirring tubes on the turret.

Although the invention has been described in considerable detail with respect to preferred embodiments thereof, it will be apparent that the invention is capable of numerous modifications and variations, apparent to those skilled in the art, without departing from the spirit and scope of the invention, as defined in the claims.

I claim:

1. An apparatus for axial shirring of tubular material, such as artificial casing for sausage manufacturing, comprising:
    a turret means comprising at least two shirring tubes extending therefrom substantially parallel to each other, said turret means being movable to bring each of said shirring tubes, one at a time, to a shirring position,
    a shirring tool positioned to cooperate with the shirring tube located at the shirring position, said shirring tool being non-axially movable relative to the axis of the shirring tool,
    a stop member axially slidably disposed on each shirring tube,
    and means for moving the stop member along the shirring tube, during the shirring operation, first towards and then controllably away from the shirring tube, as it receives shirred tubular material, while the shirring tube itself remains stationary against axial movement.

2. An apparatus according to claim 1, said turret being movable to move the shirring tubes transverse to their axes between the shirring position and other positions, and said turret also being movable axially of the shirring tubes to move that shirring tube in the said shirring position into cooperative engagement with the said shirring tool.

3. An apparatus according to claim 2, wherein said axial movement of the turret, with its shirring tubes, is limited to the distance required to bring the shirring tube located at the shirring position into and out of cooperative engagement with the shirring tool.

4. An apparatus according to claim 1 or claim 2, including stabilizing means, located adjacent the shirring tool, for engaging and stabilizing the tubular material as it is being shirred on the shirring tube.

5. An apparatus according to claim 4, said stabilizing means comprising a pair of guide rolls, each having a trough shaped profile, said guide rolls mounted on lever means for movement into engagement with and away from the shirred tubular material.

6. An apparatus according to any one of claims 1, 2 or 3, wherein the turret supports two shirring tubes and is indexible about an axis through 180° to bring the shirring tubes into said shirring position and said other positions.

7. An apparatus according to any one of claims 1, 2 or 3, wherein the shirring tool has a cutting means disposed on the side of the shirring tool towards the turret, and said cutting means being operable to cut the finished shirring to separate it from the length of tubular material at the shirring tool.

8. An apparatus according to claim 7, wherein the cutting means comprises a motor driven cutting plate movable through the shirring, crosswise, after the turret has moved to move the shirring tube out of the shirring tool.

9. An apparatus according to any one of claims 1, 2 or 3, including a further position of the shirring tubes, said turret being operable to locate at least one of the shirring tubes at said further position when another shirring tube is located at the shirring position, and including pressing means and backup means at said further position, said pressing means being operably to move a finished shirred tube against the backup means to further compress it.

10. An apparatus according to claim 9, said pressing means including means for engaging the said stop member on that shirring tube and moving it in an axial direction opposite to the shirring direction, to effect said compressing, said pressing means being operable simultaneously with a shirring procedure on a shirring tube at the shirring position.

11. An apparatus according to claim 9, said backup means having jaw means movable to a closed position during the compression, and movable to an open position to permit movement of the finished shirred tube therepast and off of the shirring tube.

12. An apparatus according to claim 10, wherein said pressing means includes a slidable carriage actuated by a power cylinder, said carriage including a connecting member movable transverse to the direction of movement of the slidable member to engage a groove in the stop member of the shirring tube at said further position.

13. An apparatus according to any one of claims 1, 2 or 3, wherein the said stop member on each shirring tube comprises a sleeve which tapers conically at its end facing away from the turret, which sleeve can be engaged in the shirring position by a connecting member which is controllably movable along the shirring tube.

14. An apparatus according to claim 13, wherein the connecting member comprises two claw levers which are opposedly swingable into an annular groove of the sleeve, said claw levers being mounted on a carriage slidable by a power means parallel to the shirring tube at the shirring position.

15. An apparatus according to any one of claims 1, 2 or 3, including a further position of the shirring tubes, said turret being operable to locate at least one of the shirring tubes at said further position when another shirring tube is located at the shirring position, and including pressing means and backup means at said further position, said pressing means being operable to move a finished shirring against the backup means to further compress it, and wherein the said stop member on each shirring tube comprises a sleeve which tapers conically at its end facing away from the turret, which sleeve can be engaged in the shirring position by a connecting member which is controllably movable along the shirring tube, and wherein the connecting member comprises two claw levers which are oppposedly swingable into an annular groove of the sleeve, said claw levers being mounted on a carriage slidable by a power means parallel to the shirring tube at the shirring position.

16. An apparatus according to claim 15, said pressing means including a slidable carriage actuated by a power means and including a connecting member movable transverse to the direction of movement of the slidable carriage for engaging into an annular groove in the sleeve of the stop member on the shirring tube located at said further position, whereby movement of the carriage acts through the connecting member to move the stop member to compress the finished shirred tubular material at the said further position.

17. An apparatus according to any one of claims 1, 2 or 3, including a double acting power means for moving the turret axially between its two end positions.

* * * * *